United States Patent Office 3,012,032
Patented Dec. 5, 1961

3,012,032
2-[2-(4-PYRIDYL)-ETHYL]-6-METHYL-4,5-DIHYDRO-3-PYRIDAZINONE
Gabriel Gever, Oxford, and Julian G. Michels, Norwich, N.Y., assignors to The Norwich Pharmacal Company, Norwich, N.Y., a corporation of New York
No Drawing. Filed May 7, 1958, Ser. No. 733,465
1 Claim. (Cl. 260—250)

This invention relates to a new chemical compound which potentiates drugs affecting the central nervous system and to a new chemical compound useful as an intermediate in the preparation thereof.

We have discovered that certain drugs affecting the central nervous system can be rendered more active physiologically by means of 2-[2-(4-pyridyl)ethyl]-6-methyl-4,5-dihydro-3-pyridazinone. It may be represented by the formula:

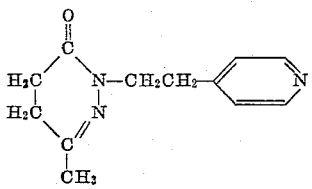

The new chemical that is useful as an intermediate in the preparation of our potentiating compound is 2-(4-pyridyl)ethylhydrazine. It may be represented by the formula:

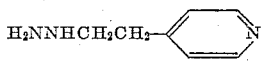

That intermediate is readily produced in good yield by bringing together hydrazine hydrate and 4-vinylpyridine and applying heat to the mixture over a relatively short time period.

We have found that 2-[2-(4-pyridyl)ethyl]-6-methyl-4,5-dihydro-3-pyridazinone may be readily prepared by causing our intermediate, 2-(4-pyridyl)ethylhydrazine, to react with levulinic acid or an ester of that acid such as the ethyl ester. The method which we prefer consists in reacting 2-(4-pyridyl)ethylhydrazine with levulinic acid, removal of water formed in the reaction, as by distillation under reduced pressure, and subsequent distillation of the reaction product. Thereafter the reaction product may be recrystallized, if desired.

Another suitable method for preparing our compound consists of reacting our intermediate, 2-(4-pyridyl)ethylhydrazine, with an alkyl levulinate; the alcohol is removed by distillation and the reaction product is distilled.

Our new compound has been found to potentiate drugs such as pentobarbital, hexobarbital, chloral hydrate, chlorpromazine, mephenesin, strychnine, and diphenylhydantoin (Dilantin), which affect the central nervous system, by increasing the duration of their effect or by rendering them effective in lesser quantities than those that may be employed when they are used without our new potentiating compound.

The prolongation of the period of action of these centrally acting drugs that is accomplished through the administration with them, or just before their administration, of our new potentiating compound is of particular value in connection with surgical and obstetrical procedures. The lowering of the dosage normally required for known centrally acting drugs to produce their effect, thus achieving the desired action at less dose, is a highly valuable property when medical emergencies arise.

Our new potentiating compound exhibits no discernible action per se on the central nervous system; and no toxic manifestations have been observed as a result of its administration. Its valuable physiological effect is manifested when it is administered to animals in conjunction with known centrally acting drugs. Doses of our compound of the order of about 40 to about 220 mg./kg. in mice given per os or intraperitoneally are safe and effective. That dose range may be varied depending on the extent of potentiation sought and the particular central nervous system acting drug involved.

Representative of the potentiation induced by our new compound are the data in the following Table I which show the prolongation of hexobarbital narcosis in mice:

TABLE I

Effect of increasing doses of potentiating compound (2-[2-(4-pyridyl)-ethyl]-6-methyl-4,5-dihydro - 3 - pyridazinone) administered one hour prior to hexobarbital on narcosis in mice

| Number of Mice | Dose of Hexobarbital mg./kg., i.p. | Dose of Potentiating Compound mg./ kg., p.o. | Total Sleeping Time (min.) | Increase in Sleeping Time (min.) | Percent Increase Sleeping Time |
|---|---|---|---|---|---|
| 10 | 100 | | 35.4 | | |
| 10 | 100 | 10 | 30.1 | 0 | 0 |
| 10 | 100 | 20 | 38.3 | 0 | 0 |
| 10 | 100 | 40 | 58.8 | 23.4 | 66 |
| 10 | 100 | 80 | 110.4 | 75.0 | 212 |
| 10 | 100 | 160 | 250.5 | 215.1 | 608 |
| 20 | 100 | 220 | 256.0 | 221.6 | 626 |

The prolongation of hexobarbital narcosis in mice produced by our potentiating compound when it is administered concurrently with and at various time intervals preceding the administration of the centrally acting drug is exemplified in the following Table II:

TABLE II

Duration of action of potentiating compound (2-[2-(4-pyridyl)-ethyl]-6-methyl-4,5-dihydro-3-pyridazinone)

[Hexobarbital—100 mg./kg., i.p. Potentiating Compound—220 mg./kg., p.o.]

| Number of Mice | Time of Potentiating Compound Treatment (hrs.) | Total Sleeping Time (min.) | Increase in Sleeping Time (min.) | Percent Increase Sleeping Time |
|---|---|---|---|---|
| 10 | | 27.9 | | |
| 10 | Concurrent | 322.0 | 294.1 | 1,054 |
| 10 | 2 ante | 222 | 194.1 | 696 |
| 10 | 4 ante | 95.3 | 67.4 | 242 |
| 10 | 6 ante | 34.4 | 6.5 | 23 |
| 10 | 16 ante | 10.9 | −17.0 | −61 |

The potentiating effect displayed by our new compound upon the anticonvulsant drug, "Dilantin," in its known protective influence against electroshock in mice is presented in the following Table III:

TABLE III

Dilantin potentiation by potentiating compound (2-[2-(4-pyridyl) - ethyl]-6-methyl - 4,5 - dihydro-3-pyridazinone) administered one hour prior to drug

| Number of Mice | Dose | | Percent Protection at— | | | |
|---|---|---|---|---|---|---|
| | Dilantin, mg./kg. | Potentiating Compound, mg./kg. | 1 hr. | 2 hr. | 3 hr. | 4 hr. |
| 20 | 7.7 | | 5 | 35 | 60 | 55 |
| 20 | 7.7 | 110 | 45 | 85 | 85 | 95 |
| 20 | 7.7 | 220 | 30 | 80 | 95 | 90 |
| 20 | 7.7 | 330 | 55 | 95 | 95 | 90 |
| 20 | 7.7 | 440 | 60 | 90 | 95 | 95 |

Further demonstrations of the potentiating character of our new chemical compound upon centrally acting agents when administered by various routes are set forth in the following Table IV:

TABLE IV

| Drug; Dose (mg./kg.) and Route | Species | Potentiating Compound Dose (mg./kg.) and Route | Effect |
|---|---|---|---|
| Pentobarbital; 25; i.p. | Rat | | Expected narcotic effect. |
| Do | do | 100; i.p. | 168% increase in duration of narcotic effect. |
| 40; i.p. | Mouse | | Expected narcotic effect. |
| 40; i.p. | do | 220; p.o. | 778% increase in duration of narcotic effect. |
| Hexobarbital; 100; i.p. | Rat | | Expected narcotic effect. |
| Do | do | 100; i.p. | 100% increase in duration of narcotic effect. |
| Chloral hydrate; 400; i.p. | Mouse | | Expected narcotic effect. |
| Do | do | 220; p.o. | 30% increase in duration of narcotic effect. |
| Mephenesin; 250; i.p. | do | | Expected paralytic effect. |
| Do | do | 80; p.o. | 150% increase in duration of paralytic effect. |
| Chlorpromazine; 2.0; i.p. | Rat | | Typical "tranquilizing" effect (2 hrs.). |
| Do | do | 100; i.p. | Typical "tranquilizing" effect extended over 3 hrs. |
| Strychnine; 1.3; i.p. | Mouse | | 20% convulsed; 15% died. |
| Do | do | 220; p.o. | 100% convulsed and died. |

Administration of our new potentiating compound per se, or formulated with centrally acting drugs which it potentiates, may be readily accomplished through the use of suitable pharmaceutical adjuvants and excipients in the form of tablets, capsules, powders, elixirs, suspensions, and injectable menstrua such as water and aqueous polyhydric alcohols. It is not necessary that our potentiating compound and the centrally acting agent be administered in the same form or by the same route. For instance, as elected, one may be per os and the other intraperitoneal; or one intravenous and the other per os. In short, a selection of forms and routes of administration is available to fit the requirements of a particular situation.

In order that the preparation of our new chemical compounds may be fully available to those skilled in the art, the following illustrative examples are given:

EXAMPLE I (A) *Intermediate*—To 225 cc. (4.5 moles) of 100% hydrazine hydrate heated at 93° C. on the steam bath is added, during 7 minutes, 159 g. (1.5 moles) of 4-vinylpyridine. Heating is continued for two additional hours. The internal temperature reaches a maximum of about 104.5° C. three minutes after the addition is completed at which time all of the 4-vinylpyridine is dissolved. After the heating period, the excess hydrazine is distilled at reduced pressure and the product vacuum distilled. 155.5 g. (76%), B.P.=147.5–149.5° C. at 6–7 mm., of 2-(4-pyridyl)ethylhydrazine are obtained.

(B) *Potentiating compound*—To 116 g. (1 mole) of levulinic acid is added slowly with mixing and cooling 147 g. (1 mole) of 2-(4-pyridyl)-ethylhydrazine. The reaction mixture is freed of water by heating on a steam bath under reduced pressure. The residue is distilled under vacuum giving 200 gm. (92%) of 2-[2-(4-pyridyl)ethyl] - 6 - methyl-4,5-dihydro-3-pyridazinone boiling at 157.5° C. at 0.3 mm. The distillate may be recrystallized from isopropyl ether (15 cc./gm.) using charcoal (Darco) to give an 86% recovery of purified product; M.P. 91–92° C.

EXAMPLE II

A mixture of 41.1 g. (0.3 mole) of 2-(4-pyridyl)-ethylhydrazine prepared as in Example I, 50 cc. of water, 43.2 g. (0.3 mole) of ethyl levulinate and 25 cc. of alcohol is refluxed on the steam bath for 1 hour. The alcohol and water are then removed as completely as possible under vacum. The 68 g. of crude residue crystallizes on cooling. Two recrystallizations from 60–90° C. ligroine using charcoal (Darco), allowing the solution to cool slowly with stirring, yields 32 g. (49%) of 2-[2-(4-pyridyl)ethyl]-6-methyl - 4,5 - dihydro-3-pyridazinone; M.P. 91–93° C.

What is claimed is:

The chemical compound 2 - [2 - (4-pyridyl)ethyl]-6-methyl-4,5-dihydro-3-pyridazinone represented by the formula:

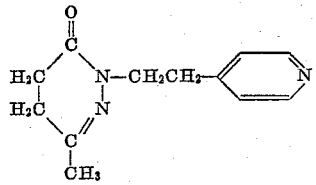

References Cited in the file of this patent

UNITED STATES PATENTS 2,783,232    Gutmann    Feb. 7, 1957
2,839,532    Druey et al.    June 17, 1958

FOREIGN PATENTS 656,228    Great Britain    Aug. 15, 1951

OTHER REFERENCES

Takeda et al.: Chem. Abstracts, vol. 49 (1955), col. 14, 244a.

Hellman: Chem. Ber., vol. 89, (1956), pages 594–600.